US012214365B2

(12) United States Patent
Shim et al.

(10) Patent No.: US 12,214,365 B2
(45) Date of Patent: Feb. 4, 2025

(54) ELECTRIFICATION APPARATUS FOR ELECTRIC DUST COLLECTION AND AIR CONDITIONER FOR VEHICLE INCLUDING SAME

(71) Applicant: LG Electronics Inc., Seoul (KR)

(72) Inventors: Hyunmin Shim, Seoul (KR); Naehyun Park, Seoul (KR); Namgyu Shin, Seoul (KR); Keonwang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 590 days.

(21) Appl. No.: 17/493,049

(22) Filed: Oct. 4, 2021

(65) Prior Publication Data
US 2022/0023881 A1    Jan. 27, 2022

Related U.S. Application Data

(63) Continuation of application No. 16/049,521, filed on Jul. 30, 2018, now Pat. No. 11,198,137.

(30) Foreign Application Priority Data

Jul. 20, 2018    (KR) ........................ 10-2018-0084907

(51) Int. Cl.
*B03C 3/45*    (2006.01)
*B03C 3/04*    (2006.01)
(Continued)

(52) U.S. Cl.
CPC ................. *B03C 3/45* (2013.01); *B03C 3/04* (2013.01); *B03C 3/38* (2013.01); *B03C 3/82* (2013.01);
(Continued)

(58) Field of Classification Search
CPC .... B03C 3/02; B03C 3/09; B03C 3/34; B03C 3/366; B03C 3/38; B03C 3/40;
(Continued)

(56) References Cited

U.S. PATENT DOCUMENTS

| | | | | |
|---|---|---|---|---|
| 1,344,330 | A | * | 6/1920 | Bradley .................... B03C 3/86 96/64 |
| 4,643,745 | A | | 2/1987 | Sakakibara et al. |

(Continued)

FOREIGN PATENT DOCUMENTS

| | | |
|---|---|---|
| JP | 2004136196 | 5/2004 |
| JP | 2006046727 | 2/2006 |

(Continued)

OTHER PUBLICATIONS

Office Action in Chinese Appln. No. 201810869820, mailed on Jan. 19, 2023, 20 pages (with Machine translation).

(Continued)

*Primary Examiner* — Christopher P Jones
*Assistant Examiner* — Sonji Turner
(74) *Attorney, Agent, or Firm* — Fish & Richardson P.C.

(57) ABSTRACT

An electrification apparatus is used for electric dust collection in an air conditioner for a vehicle. The electrification apparatus includes a frame, a conductive microfiber, and a conductive plate. The frame includes a main body frame in which the conductive plate is installed and an installation frame that defines a fixing groove in which the conductive microfiber is installed. The electrification apparatus further includes a rubber coupled with the conductive microfiber and inserted into the fixing groove.

17 Claims, 8 Drawing Sheets

(51) Int. Cl.
*B03C 3/38* (2006.01)
*B03C 3/82* (2006.01)
*B60H 3/00* (2006.01)

(52) U.S. Cl.
CPC ........ *B60H 3/0071* (2013.01); *B03C 2201/30* (2013.01)

(58) Field of Classification Search
CPC .... B03C 3/41; B03C 3/45; B03C 3/47; B03C 3/49; B03C 3/60; B03C 3/64; B03C 3/70; B03C 3/82; B03C 3/86; B03C 2201/04; B03C 2201/06; B03C 2201/10; B03C 2201/30
See application file for complete search history.

(56) References Cited

U.S. PATENT DOCUMENTS

| | | | |
|---|---|---|---|
| 5,322,550 A | 6/1994 | Park | |
| 5,456,741 A | 10/1995 | Takahara et al. | |
| 6,790,259 B2 | 9/2004 | Rittri et al. | |
| 7,238,225 B2 | 7/2007 | Hong et al. | |
| 7,332,019 B2* | 2/2008 | Bias | B03C 3/72 96/26 |
| 7,351,274 B2* | 4/2008 | Helt | B03C 3/12 96/26 |
| 7,601,204 B2* | 10/2009 | Woodruff | B03C 3/017 96/81 |
| 7,655,076 B2 | 2/2010 | Griffiths et al. | |
| 8,498,092 B2* | 7/2013 | Itani | B03C 3/38 361/231 |
| 9,441,845 B2* | 9/2016 | Waddell | H01J 27/02 |
| 9,551,497 B2* | 1/2017 | Waddell | H01T 23/00 |
| 9,847,623 B2* | 12/2017 | Sunshine | H01T 23/00 |
| 10,317,096 B2* | 6/2019 | Waddell | H01T 19/04 |
| 10,384,517 B2 | 8/2019 | Lee et al. | |
| 10,414,247 B2 | 9/2019 | Jee et al. | |
| 2006/0130658 A1 | 6/2006 | Chang et al. | |
| 2013/0336838 A1 | 12/2013 | Waddell | |
| 2015/0253019 A1* | 9/2015 | Waddell | A61L 2/14 29/854 |
| 2016/0030949 A1* | 2/2016 | Jameson | B03C 3/47 96/100 |
| 2016/0190772 A1 | 6/2016 | Sunshine | |
| 2018/0162201 A1* | 6/2018 | Jee | B60H 3/0608 |
| 2020/0161839 A1* | 5/2020 | Waddell | H01T 23/00 |

FOREIGN PATENT DOCUMENTS

| | | |
|---|---|---|
| JP | 2015083293 | 4/2015 |
| KR | 10-0407688 | 12/2003 |
| KR | 20-0429549 | 10/2006 |
| KR | 20160015640 | 2/2016 |
| KR | 10-2016-0084756 | 7/2016 |
| KR | 20160084756 | 7/2016 |
| KR | 10-2016-0101409 | 8/2016 |
| WO | WO2014007558 | 1/2014 |

OTHER PUBLICATIONS

Office Action in Korean Appln. No. 10-20180084907, mailed on Mar. 22, 2023, 13 pages (with English translation).

* cited by examiner

ELECTRIFICATION APPARATUS FOR ELECTRIC DUST COLLECTION AND AIR CONDITIONER FOR VEHICLE INCLUDING SAME

BACKGROUND

The present invention relates to an electrification apparatus for electric dust collection and an air conditioner for a vehicle including the same.

An air conditioner is a device for keeping the air in a predetermined space in a most suitable condition according to use and purpose. Generally, in the air conditioner, a compressor, a condenser, an expansion device, and an evaporator are provided, and a refrigeration cycle for compressing, condensing, expanding, and evaporating a refrigerant is driven to cool or heat the predetermined space.

The predetermined space may be variously proposed according to the place where the air conditioner is used. For example, in a case where the air conditioner is installed in a home or an office, the predetermined space may be an indoor space of a house or a building.

In addition, the predetermined space may correspond to the interior of a vehicle. Accordingly, the air conditioner for cooling or heating the interior of the vehicle can be classified as an air conditioner for a vehicle.

At this time, the air conditioner or the air conditioner for a vehicle may include an electric dust collector for electrifying and collecting dust particles in the air. In addition, the electric dust collector may be installed in a product other than the air conditioner, or the like, and for example, the electric dust collector may be installed in an air cleaner, a humidifier, or the like. In addition, the electric dust collector can be independently installed in the air to remove dust in the air.

At this time, the following prior art relating to an electric dust collector installed in the air conditioner for a vehicle has been filed and disclosed.

RELATED ART 1

1. Korea patent publication number: 10-2016-0015640 (publication date: Feb. 15, 2016)
2. Title of Invention: Electric dust collector for vehicle As described in the above-mentioned related art 1, the electric dust collector is mounted on the vehicle air conditioner in a state where the filter unit and the electrification unit are integrally formed with each other. In addition, the electrification unit includes an electrification plate having a plurality of circular through-holes and an electrification pin installed on the center of the through-hole. Dust particles passing through the electrification plate and the electrification pin are electrified and collected in the filter unit.

The related art 1 has the following problems.

(1) The electrification plate and the electrification pin are installed on separate mounting portions and assembled. Accordingly, there is a problem that the relative position of the electrification plate and the electrification pin can be changed during the assembling process. Particularly, the relative position of the electrification plate and the electrification pin corresponds to a factor for determining the electrification efficiency. Therefore, there is a problem that it is difficult to keep the electrification efficiency constant according to the assembling process.

(2) In addition, each electrification pin is installed and fixed to the electrification pin member at a predetermined interval. The electrification pin member and the electrification plate are assembled so that the electrification pin is positioned at the center of the through hole formed in the electrification plate. In this way, there are problems that a relatively complicated process is required to assemble the electrification pin and the electrification plate, and the assembling time is long.

(3) In addition, the electrification pin corresponds to a needle-shaped type having a sharp end. Such needle-shaped electrification pins have a problem that harmful substances such as ozone may be generated. In particular, in a case where the electrification pin is installed in an air conditioner for a vehicle for cooling and heating the inside of a relatively narrow and closed vehicle, there is a high possibility that the user is likely to have a disease or the like.

SUMMARY

In order to solve such a problem, an objective of the present embodiment is to propose an electrification apparatus for electric dust collection having a simple installation structure and an air conditioner for a vehicle including the same.

In particular, an objective of the present invention is to propose an electrification apparatus for electric dust collection having a structure in which conductive microfiber is simply installed on a frame and an air conditioner for a vehicle including the same.

In addition, an objective of the present invention is to propose an electrification apparatus for electric dust collection having a structure in which electric wires extending from the conductive microfiber is disposed along a frame and an air conditioner for a vehicle including the same.

According to the teachings of the present invention, an electrification apparatus for electric dust collection including: a frame which forms an outer appearance; conductive microfiber which is installed in the frame and generate ions in the air; and conductive plates which are installed in the frame and generate a potential difference with the conductive microfiber. The frame includes a main body frame on which the conductive plate is installed and an installation frame on which the conductive microfiber is installed. At this time, the electrification apparatus for electric dust collection further includes a rubber which is coupled with the conductive microfiber and inserted into the fixing groove.

Meanwhile, the air conditioner for a vehicle according to the teachings of the present invention includes a main body which has a suction port and a discharge port and an electrification apparatus for electric dust collection which is installed inside the main body to remove foreign matters from the air introduced into the suction port.

The electrification apparatus for electric dust collection includes a frame which has a plurality of fixing grooves, a plurality of conductive microfiber which is installed in the plurality of fixing grooves, respectively and conductive plates which form a plurality of electrification spaces in which a plurality of conductive microfiber is disposed, respectively.

According to the proposed embodiment, there is an advantage that the conductive microfiber can be disposed at the correct positions through a simple installation structure. Particularly, since the conductive microfiber is disposed at the correct positions, there is an advantage that the electrification performance can be kept at the maximum.

In addition, the conductive microfiber is fixed to the frame by a rubber, which is an elastic material. Accordingly, the rubber absorbs vibrations and impacts, thereby preventing vibrations and impacts from being transmitted to the conductive microfiber.

In addition, an electric wire extending from the conductive microfiber is seated inside the frame. Thereby, there is an advantage that the electrically conductive microfibers can be more stably fixed. In addition, it is possible to form a neat appearance and to prevent damage from external obstacles and the like.

DETAILED DESCRIPTION OF THE EMBODIMENTS

Figure 1:
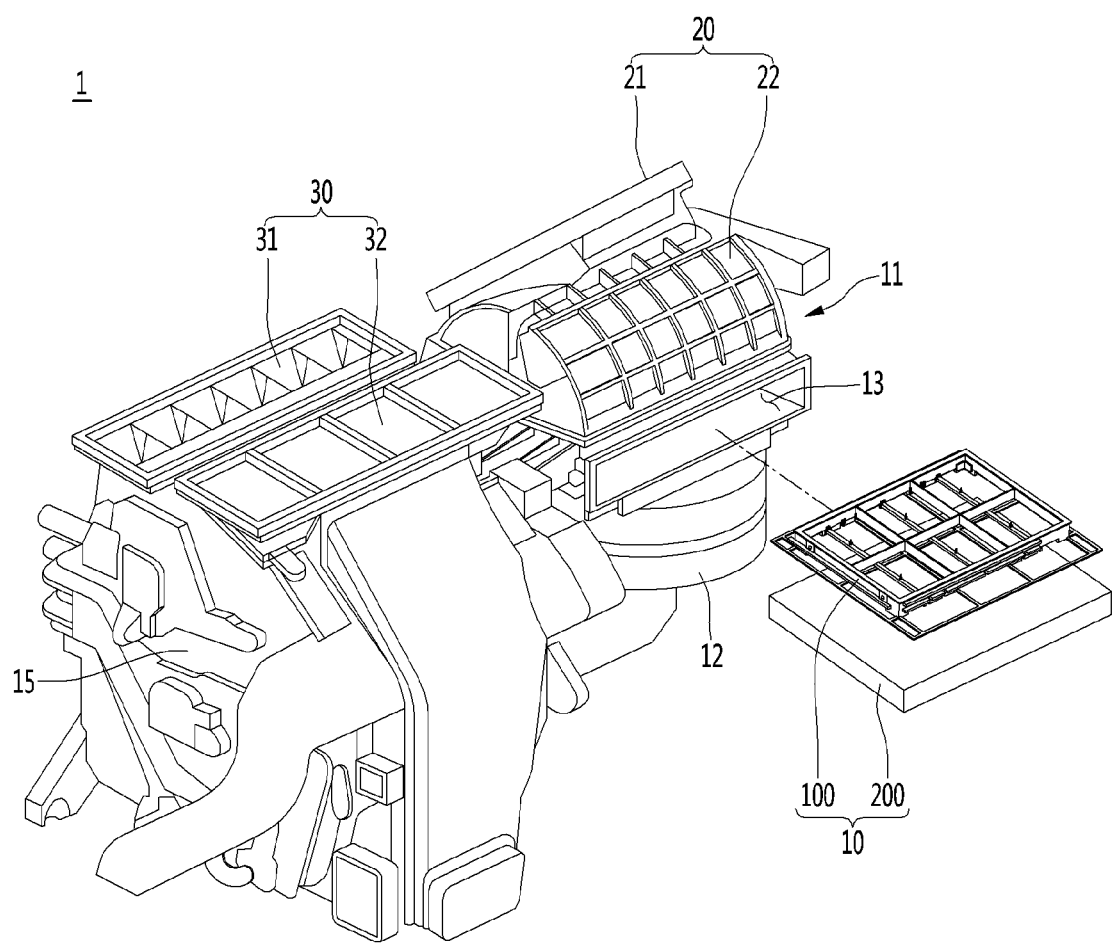
FIG. 1 is a view illustrating an air conditioner for a vehicle and an electric dust collection assembly installed therein according to an embodiment of the present invention.

Hereinafter, some embodiments of the present invention will be described specifically with reference to exemplary drawings. It is to be noted that, in adding reference numerals to the constituent elements of the drawings, the same constituent elements are denoted by the same reference numerals whenever possible, even if the same constituent elements are illustrated in different drawings. In addition, in the following description of the embodiments of the present invention, a detailed description of known functions or configurations incorporated herein will be omitted in a case where it is determined that the detailed description thereof hinders understanding of the embodiment of the present invention.

In addition, in describing the constituent elements of the embodiment of the present invention, terms such as first, second, A, B, (a), and (b) may be used. These terms are intended to distinguish the constituent elements from other constituent elements, and the terms do not limit the nature, order or sequence of the constituent elements. In a case where a constituent element is described as being "connected", "coupled", or "accessed" to another constituent element, although the constituent element may be directly connected or accessed to the other constituent element, it should be understood that another constituent element may be "connected", "coupled", or "accessed" between the respective constituent elements.

FIG. 1 is a view illustrating an air conditioner for a vehicle and an electric dust collection assembly installed therein according to a first embodiment of the present invention.

As illustrated in FIG. 1, the air conditioner 1 for a vehicle according to the teachings of the present invention includes a main body 11, 15 which forms an outer appearance. The main body may be divided into a suction main body 11 on which the suction port 20 is formed and a discharge main body 15 in which the discharge port 30 is formed.

The suction main body 11 and the discharge main body 15 are connected to each other to allow air to flow. Specifically, the suction main body 11 and the discharge main body 15 are connected to each other so that air flows from the suction main body 11 to the discharge main body 15. However, this is an example, and the air conditioner 1 for a vehicle may be provided as an integral main body.

A plurality of the suction port 20 and a plurality of the discharge port 30 may be formed in the suction main body 11 and the discharge main body 15, respectively.

The suction port 20 includes an indoor suction port 21 and an outdoor suction port 22. The indoor suction port 21 is understood as an opening through which the air inside the vehicle provided with the air conditioner 1 for a vehicle flows into the inside of the main body 11. In addition, it is to be understood that the outdoor suction port 22 is an opening through which the outside air of the vehicle flows into the inside of the main body 11.

The discharge port 30 includes a front discharge port 31 and a defrost discharge port 32. The front discharge port 31 is understood as an opening through which the air discharged from the main body 11 flows into the inside of the vehicle. In addition, the defrost discharge port 32 is understood as an opening through which the air discharged from the main body 11 flows into the windshield of the vehicle. Through the defrost discharge port, it is possible to remove frost formed in the windshield of the vehicle.

This is an example, and the suction port 20 and the discharge port 30 may be formed in various positions and numbers. For example, the discharge port 30 may further include a discharge port that discharges air to the lower side of the vehicle or a discharge port that discharges air to the rear side of the vehicle.

In addition, the air conditioner 1 for a vehicle includes a fan and a heat exchanger installed inside the main bodies 11 and 15 but is omitted in FIG. 1 for the convenience of illustration.

Specifically, a fan may be installed inside the suction main body 11. In other words, the fan can be disposed adjacent to the suction port 20. As the fan is driven, air flows into the suction main body 11 through the suction port 20. Then, air can flow from the suction main body 11 to the discharge main body 15.

A heat exchanger or a heater may be disposed in the discharge main body 15. Accordingly, the air flowing into the discharge main body 15 passes through the heat exchanger or the like and can be cooled or heated and may be discharged to the inside of the vehicle through the discharge port 30.

In addition, the air conditioner 1 for a vehicle may further include a plurality of suction ports 20 and a damper (not illustrated) for selectively opening the discharge ports 30. For example, the damper may open any one of the indoor suction port 21 and the outdoor suction port 22 and close the other. In addition, the damper may open at least one of the plurality of discharge ports 30.

In addition, in the air conditioner 1 for a vehicle according to the teachings of the present invention, an electric dust collection assembly 10 is installed. The electric dust collection assembly 10 corresponds to a configuration in which dust particles or the like in the air flowing into the air conditioner 1 for a vehicle are electrified and collected.

At this time, the electric dust collection assembly 10 may be installed in another product other than the air conditioner 1 for a vehicle. Accordingly, FIG. 1 corresponds to an example in which the electric dust collection assembly 10 is installed. In addition, the electric dust collection assembly 10 may be installed in an independent product (for example, an air purifier) to remove dust particles in the air.

The electric dust collection assembly 10 includes an electrification apparatus 100 for electric dust collection (hereinafter, electrification apparatus) and a collector 200 for electric dust collection (hereinafter, collector).

The electrification apparatus 100 functions to electrify foreign matters such as dust particles in the air. The collector 200 functions to collect dust particles and the like electrified by the electrification apparatus 100 and remove dust particles and the like from the air.

The electrification apparatus 100 includes the conductive microfiber 120 and the conductive plate 130, which will be described later. A high voltage is applied to the conductive microfiber 120, and a ground electrode is applied to the conductive plate 130.

Accordingly, the electrification apparatus 100 generates ions in the air to form an electric field. At this time, it is understood that the conductive plate 130 generates a potential difference with the conductive microfiber 120 to form an electric field. In addition, electrified particles can be collected on the conductive plate 130.

The collector 200 may be made of various materials collecting the electrified particles by the electrification apparatus 100. For example, the collector 200 may be a porous fiber filter such as a nonwoven fabric. The surface of the collector 200 may be applied, coated or attached with a conductive material. Then, a predetermined current is applied to the collector 200, so that the electrified dust particles and the like can be collected.

In summary, dust particles or the like in the air passing through the electric dust collection assembly 10 are coupled with the ions generated in the electrification apparatus 100 and are electrified. The electrified dust particles and the like can be collected in the electrification apparatus 100 or the collector 200.

Thus, the electrification apparatus 100 can function not only to generate ions but also to collect electrified dust particles and the like. Therefore, the electrification apparatus 100 may be referred to as a 'primary filter' and the collector 200 as a 'secondary filter'. Dust particles or the like in the air can be removed more easily as dust particles or the like in the air pass through the primary filter and the secondary filter in order.

At this time, in the electric dust collection assembly 10 according to the teachings of the present invention, the electrification apparatus 100 and the collector 200 are provided as separate devices, and thus is referred to as "assembly" in which a separate device is assembled or adjacently installed.

Specifically, the electrification apparatus 100 and the collector 200 can be produced and distributed through different manufacturing processes and distribution processes. In addition, the electrification apparatus 100 and the collector 200 may be coupled to each other by a separate coupling member or the like.

In addition, as described above, the electrification apparatus 100 can perform both the function of generating ions and the function of collecting dust particles. Accordingly, the electrification apparatus 100 may be installed as an independent product separately from the collector 200.

In other words, the electrification apparatus 100 may be installed in a general air conditioner or other products other than the air conditioner 1 for a vehicle. In addition, the electrification apparatus 100 may be installed independently.

In addition, the electrification apparatus 100 and the collector 200 may be installed in a predetermined product, respectively. For example, the electrification apparatus 100 and the collector 200 may be installed in the air conditioner 1 for a vehicle, respectively.

With reference to FIG. 1, the air conditioner 1 for a vehicle is provided with a dust collection installation portion 13 on which the electric dust collection assembly 10 is installed. Specifically, the dust collection installation portion 13 is formed in the suction main body 11 adjacent to the suction port 20. Particularly, the dust collection installation portion 13 is disposed at the lower side in the flow direction of the air flowing into the suction port 20.

This is because the air flowing into the suction port 20 is firstly passed through the electric dust collection assembly 10. In summary, the air flowing into the air conditioner 1 for a vehicle passes through the electric dust collection assembly 10 first, and dust particles and the like can be removed. Accordingly, it is possible to prevent foreign matters from adhering to the fan, the heat exchanger, and the like.

In addition, the air conditioner 1 for a vehicle is provided with a fan installation portion 12 on which the fan is installed. Specifically, the fan installation portion 12 is formed in the suction main body 11 adjacent to the suction port 20. Particularly, the fan installation portion 12 is disposed below the flow direction of air in the dust collection installation portion 13.

Therefore, in the suction main body 11, the suction port 20, the dust collection installation portion 13, and the fan mounting unit 12 are disposed in order in the air flow direction. Accordingly, the air flowing into the suction port 20 passes through the electric dust collection assembly 10 and the fan in order and flows into the discharge main body 15.

At this time, the electrification apparatus 100 and the collector 200 may be installed in the dust collection installation portion 13, respectively. Particularly, the collector 200 is disposed below in the flow direction of air in the electrification apparatus. Accordingly, the air flowing into the suction port 20 can pass through the electrification apparatus 100 and the collector 200 in order.

The electrification apparatus 100 may be installed in the dust collection installation portion 13 in a state where the collector 200 is seated. In other words, the electrification apparatus 100 and the collector 200 may be overlapped and seated on the dust collection installation portion 13.

In addition, a portion for fixing the electrification apparatus 100 may be formed on the inside of the dust collection installation portion 13. Accordingly, the electrification apparatus 100 may be installed in the dust collection installation portion 13, and the collector 200 may be installed in the lower portion of the electrification apparatus 100.

As described above, the electrification apparatus 100 and the collector 200 can be managed, respectively, since the electrification apparatus 100 and the collector 200 are installed, respectively. For example, the user can separate, replace, and clean the collector 200 only in the air conditioner 1 for a vehicle.

In particular, the replacement cycles of the electrification apparatus 100 and the collector 200 may be different from each other. Generally, since a larger amount of dust particles are collected in the collector 200, the replacement cycle of the collector 200 can be shorter than that of the electrification apparatus 100. Therefore, the user can replace only the collector 200 without the need to separate the electrification apparatus 100.

Hereinafter, the electrification apparatus 100 will be described specifically.

Figure 2:
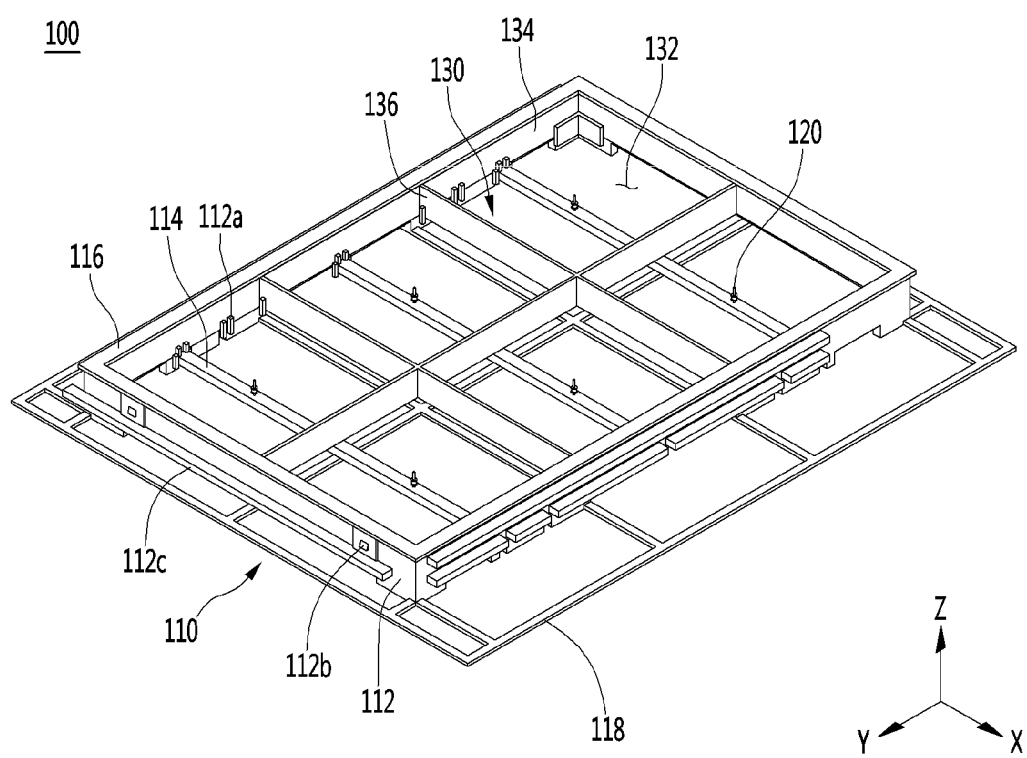
FIGS. 2 and 3 are views illustrating an electrification apparatus for electric dust collection according to an embodiment of the present invention.
Figure 3:
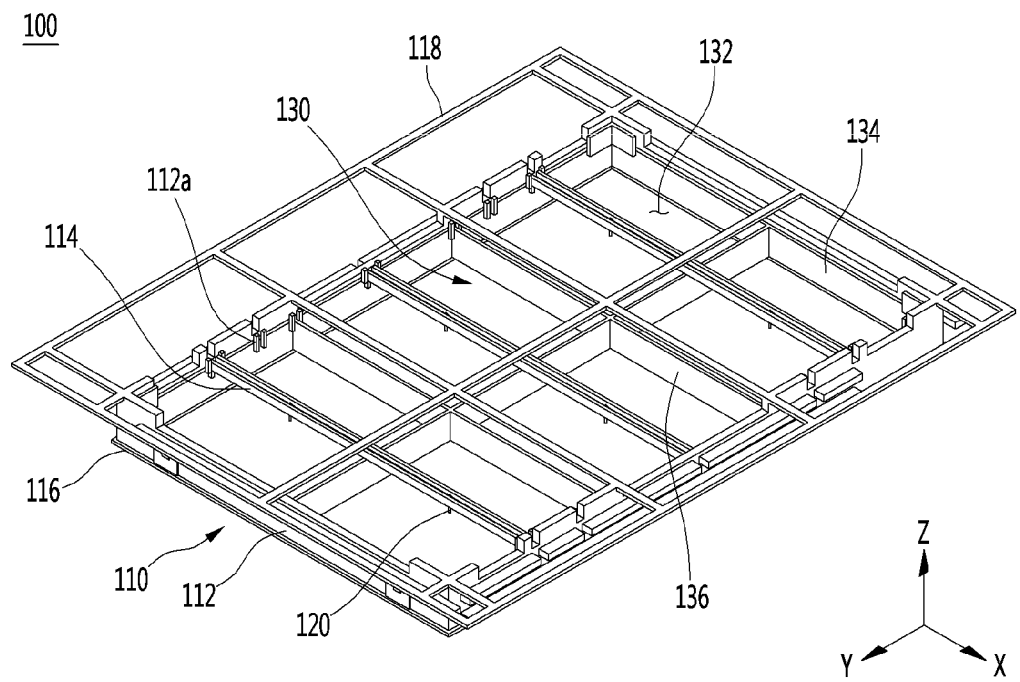
Figure 4:
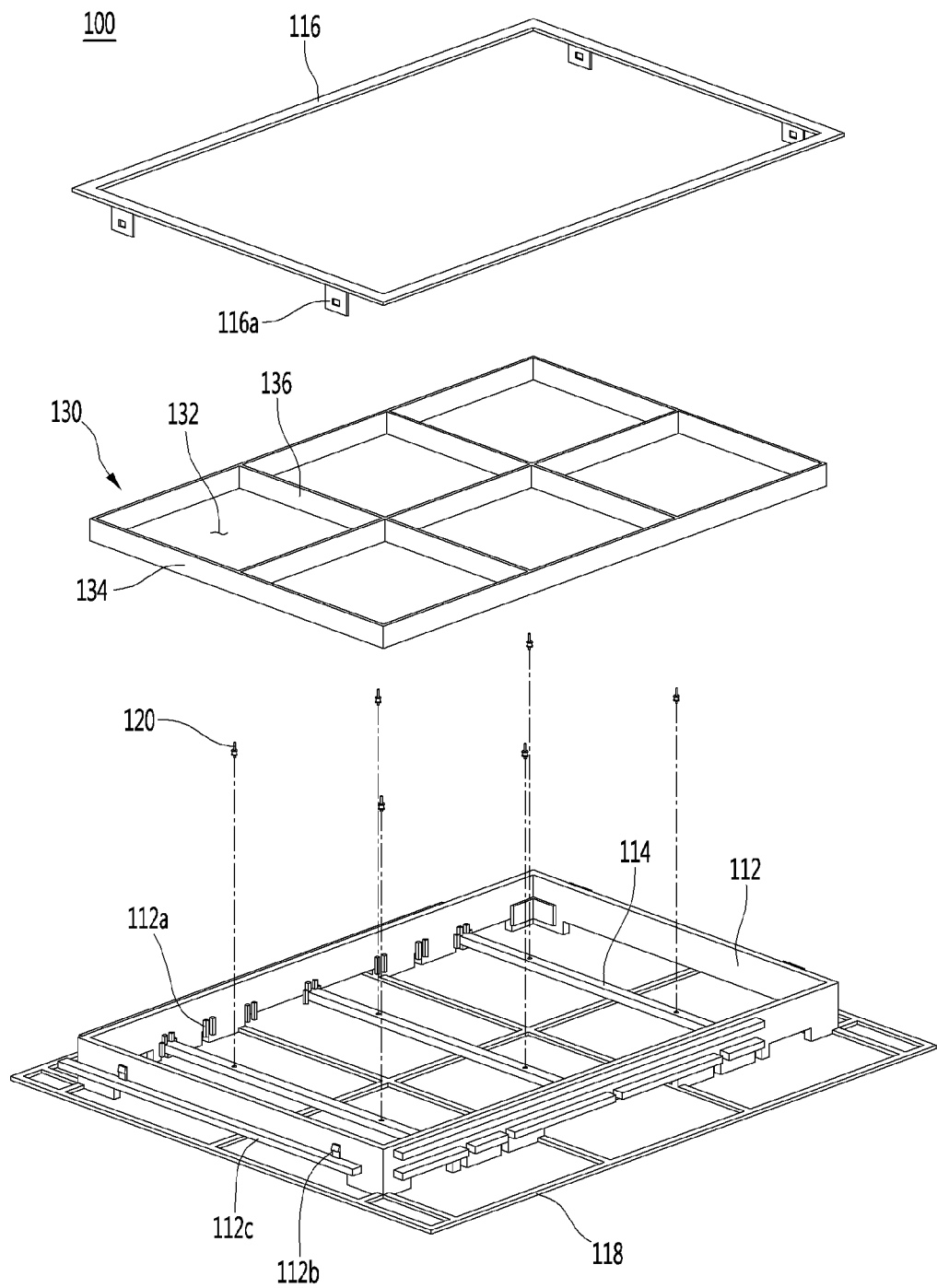
FIG. 4 is an exploded view illustrating an electrification apparatus for electric dust collection according to an embodiment of the present invention.

FIGS. 2 and 3 are views illustrating an electrification apparatus for electric dust collection according to the first embodiment of the present invention, and FIG. 4 is an exploded view illustrating the electrification apparatus for electric dust collection according to the first embodiment of the present invention.

FIG. 2 is a front perspective view of the electrification apparatus 100, and FIG. 3 is a rear perspective view of the electrification apparatus 100. In addition, FIG. 4 is a front perspective view of the electrification apparatus 100 in which the respective components are separated.

In addition, for the convenience of explanation, FIGS. 2 to 4 illustrate X, Y, and Z axes perpendicular to each other. In this case, the X, Y, and Z axes are illustrated to illustrate the relationship between each other, and the (+) and (−) directions of each axis are not distinguished.

As illustrated in FIGS. 2 to 4, the electrification apparatus 100 includes a frame 110 which forms an outer appearance of the electrification apparatus 100, conductive microfiber 120 which is provided on the frame 110, and a conductive plate 130.

The frame 110 is understood as a configuration for disposing and fixing the conductive microfiber 120 and the conductive plate 130 at predetermined positions. In addition, the frame 110 may be mounted in a space in which the electrification apparatus 100 is installed, for example, the dust collection installation portion 13 of the air conditioner 1 for a vehicle described above.

In addition, the frame 110 is made of a nonconductive material and may be formed of, for example, plastic. In addition, the frame 110 may be formed in various shapes through an injection process or the like.

The conductive microfiber 120 is understood as a configuration which is discharged by a high voltage to ionize molecules in the air. For example, the conductive microfibers 120 can generate anions such as OH—, O—, and the like, or cations such as H+ in the air.

The conductive microfiber 120 is connected to electric wires for applying a high voltage but are omitted in FIGS. 2 to 4 for the sake of convenience. In addition, the conductive microfiber 120 may be understood as one end portion of an electric wire to which a high voltage is applied.

In addition, the conductive microfiber 120 include carbon fibers. The carbon fibers are formed into superfine fibers having a diameter in the micrometer unit. When a high voltage is applied to the carbon fibers, ions are generated in the air by corona discharge.

At this time, the conductive microfiber 120 is provided in the form of a carbon brush in which hundreds or thousands of carbon fibers form one bundle. Hereinafter, one conductive microfiber 120 means one carbon brush.

In addition, the conductive microfiber 120 is disposed on the frame 110 so as to extend in the Z-axis direction. At this time, the Z-axis may correspond to an axis extending in the air flow direction. In summary, the conductive microfiber 120 may be disposed on the frame 110 in parallel with the flow direction of the air.

It is understood that the conductive plate 130 forms an electric field with the conductive microfiber 120. In addition, a ground electric wire to which a ground electrode is applied is connected to the conductive plate 130. Accordingly, between the conductive plate 130 and the conductive microfiber 120, a potential difference is generated and an electric field can be formed.

In addition, electrons can be moved to the ground electrode. Accordingly, high-density ions can be generated between the conductive microfiber 120 and the conductive plate 130. In addition, the electrification efficiency of dust particles and the like can be improved due to the electric field formed between the conductive microfiber 120 and the conductive plate 130.

In addition, the conductive plate 130 is formed of a conductive material such as metal. Accordingly, the conductive plate 130 can be understood as a metal plate having a predetermined thickness.

In addition, since the conductive plate 130 is provided as a flat plate having a predetermined area along the Z-axis, predetermined dust particles and the like can be collected. In other words, the electrified dust particles and the like can be collected in the conductive plate 130. Therefore, the electrification apparatus 100 can also perform a function of collecting the electrified dust particles and the like.

In addition, the conductive plate 130 is disposed to surround the conductive microfiber 120. Specifically, the conductive plate 130 forms a predetermined space to surround the conductive microfiber 120.

Hereinafter, the space formed by the conductive plate 130 is referred to as an electrification space 132. At this time, the electrification space 132 means space closed in the X-Y-axis direction by the conductive plate 130 and opened in the Z-axis direction.

In particular, the conductive plate 130 according to the teachings of the present invention forms a square columnar space.

Specifically, the electrification space 132 has a rectangular shape on a plane, and a rectangular columnar space extending in the Z-axis can be formed. At this time, the rectangular shape formed on the X-Y plane may correspond to a square. In other words, the electrification space 132 can be understood as a square columnar space.

The conductive microfiber 120 is positioned at the center of the electrification space 132. Specifically, the conductive microfiber 120 is positioned at the center of the electrification space 132 on the X-Y plane and extend in the Z-axis.

At this time, the electrification space 132 refers to a space formed to surround one conductive microfiber 120. Therefore, the electrification space 132 may be formed corresponding to the number of the conductive microfibers 120.

In summary, the conductive plate 130 forms a rectangular cross-section perpendicular to the flow direction of air. The conductive microfiber 120 is positioned at the center of a rectangular cross-section.

The electrification apparatus 100 may include a plurality of conductive microfibers 120. The conductive plate 130 may form a plurality of electrification spaces 132 corresponding to the plurality of conductive microfibers 120.

The plurality of conductive microfibers 120 are disposed apart from each other in the X-Y plane. In addition, each of the conductive microfibers 120 may be disposed at the same interval as the neighboring conductive microfibers 120. In addition, the plurality of conductive microfibers 120 may be arranged in parallel with the adjacent conductive microfibers 120 along the X-axis or the Y-axis. For example, as illustrated in FIGS. 2 to 4, six conductive microfibers 120 can be provided.

The plurality of electrification spaces 132 are formed on the X-Y plane in a state of being separated from each other so as to correspond to the plurality of conductive microfibers 120. The conductive plate 130 includes an outer plate 134 for forming the plurality of electrification spaces 132 and an inner plate 136 for separating the plurality of electrification spaces 132.

The outer plate 134 can be understood as a configuration that forms an outer appearance of the conductive plate 130. Specifically, the outer plate 134 may be provided in a rectangular frame shape.

The outer plate 134 forms a space in which the plurality of electrification spaces 132 are combined. Specifically, the outer plate 134 has a rectangular shape in the X-Y plane and forms a rectangular columnar space extending in the Z-axis.

The inner plate 136 may be understood as a configuration that divides the space formed by the outer plate 134 into the electrification spaces 132. Accordingly, both ends of the inner plate 136 can be connected to the outer plate 134. In particular, the inner plate 136 extends in the X-axis or the Y-axis. For example, the inner plate 136 may divide the space formed by the outer plate 134 into six electrification spaces 132.

At this time, the outer plate 134 and the inner plate 136 may be integrally formed with each other. Alternatively, the outer plate 134 and the inner plate 136 may be separately fabricated and coupled with each other.

In the electrification apparatus of the related art, the electrification space is formed into a cylindrical shape around the conductive microfibers. Thereby, air cannot flow between the electrification spaces, or a death zone can be formed which cannot be electrified.

However, in a case where the electrification space is formed into a square columnar shape as in the present invention, there is no dead space between the electrification spaces. Therefore, the electrification space per the same space can be maximized. Accordingly, the flow rate of the air passing through the electrification space can be maximized.

The frame 110 includes a main body frame 112 on which the conductive plate 130 is installed and an installation frame 114 on which the conductive microfibers 120 are installed.

The main body frame 112 can be understood as a configuration that forms an outer appearance of the frame 110. In addition, the outer plate 134 may be fitted to the main body frame 112. Accordingly, the main body frame 112 is provided in a shape corresponding to the outer plate 134.

Therefore, the main body frame 112 is provided in a rectangular frame shape as in the outer plate 134. Specifically, the outer plate 134 is installed on the main body frame 112 such that the outer surface of the outer plate 134 is in contact with the inner surface of the main body frame 112.

In addition, the main body frame 112 is provided with a plurality of fixing protrusions 112a which are in contact with the inner surface of the outer plate 134. In addition, the outer plate 134 may be fixed to the main body frame 112 by means of a bonding member such as a bond.

In addition, the frame 110 further includes a cover frame 116 coupled to an upper end of the main body frame 112. The cover frame 116 may be coupled to the main body frame 112 to cover the upper end of the outer plate 134. In other words, the outer plate 134 may be fixed in the Z-axis by coupling of the main body frame 112 and the cover frame 116.

The cover frame 116 and the main body frame 112 can be hooked. For example, the main body frame 112 may have a hook 112b protruding outwardly, and the cover frame 116 may be formed with a hook groove 116a into which the hook 112b is inserted.

In addition, the main body frame 112 is formed with a frame installation protrusion 112c protruding outwardly and extending along the main body frame 112. The frame installation protrusion 112c may correspond to a portion which is seated in a product on which the electrification apparatus 100 is installed.

For example, protrusions on which the frame installation protrusion 112c is seated may be formed on the inside of the dust collection installation portion 13. Therefore, the electrification apparatus 100 may be installed in the dust collection installation portion 13 such that the frame installation protrusion 112c is seated on the protrusion.

In addition, the frame installation protrusion 112c may be formed on the outer surface of the main body frame 112. In other words, the frame installation protrusion 112c may be formed on all four surfaces forming the main body frame 112. Accordingly, the electrification apparatus 100 can be installed by the frame installation protrusion 112c irrespective of the direction in which the electrification apparatus 100 is installed in the product.

For example, the main body frame 112 or the conductive plate 130 is formed as a rectangular frame having a long surface and a short surface. With reference to FIG. 1, the electrification apparatus 100 is inserted into the dust collection installation portion 13 such that end surface of the electrification apparatus 100 is disposed on both sides of the dust collection installation portion 13. Accordingly, the frame installation protrusion 112c formed on the end surface of the main body frame 112 can be seated on the inner surface of the dust collection installation portion 13.

The installation frame 114 is installed in an inside of the main body frame 112 in a state of extending into one side. In other words, both ends of the installation frame 114 are fixed to the main body frame 112. In the installation frame 114, a fixing groove 114a into which the conductive microfibers 120 are inserted is formed. At this time, the fixing grooves 114a are formed to correspond to the number of the conductive microfibers 120.

In addition, the frame 110 may further include an auxiliary frame 118. The auxiliary frame 118 can be understood as a configuration that maintains the rigidity of the frame 110. In other words, the auxiliary frame 118 corresponds to a configuration for preventing the main body frame 112 and the installation frame 114 from being deformed. Accordingly, the auxiliary frame 118 may have various shapes according to the design and may be omitted.

As described above, the frame 110 may be formed by an injection process. Accordingly, although the frame 110 has been described specifically, the frame 110 may be integrally formed.

Hereinafter, the shape and arrangement of the conductive microfibers 120 and the conductive plate 130 according to the teachings of the present invention will be described specifically.

Figure 5:
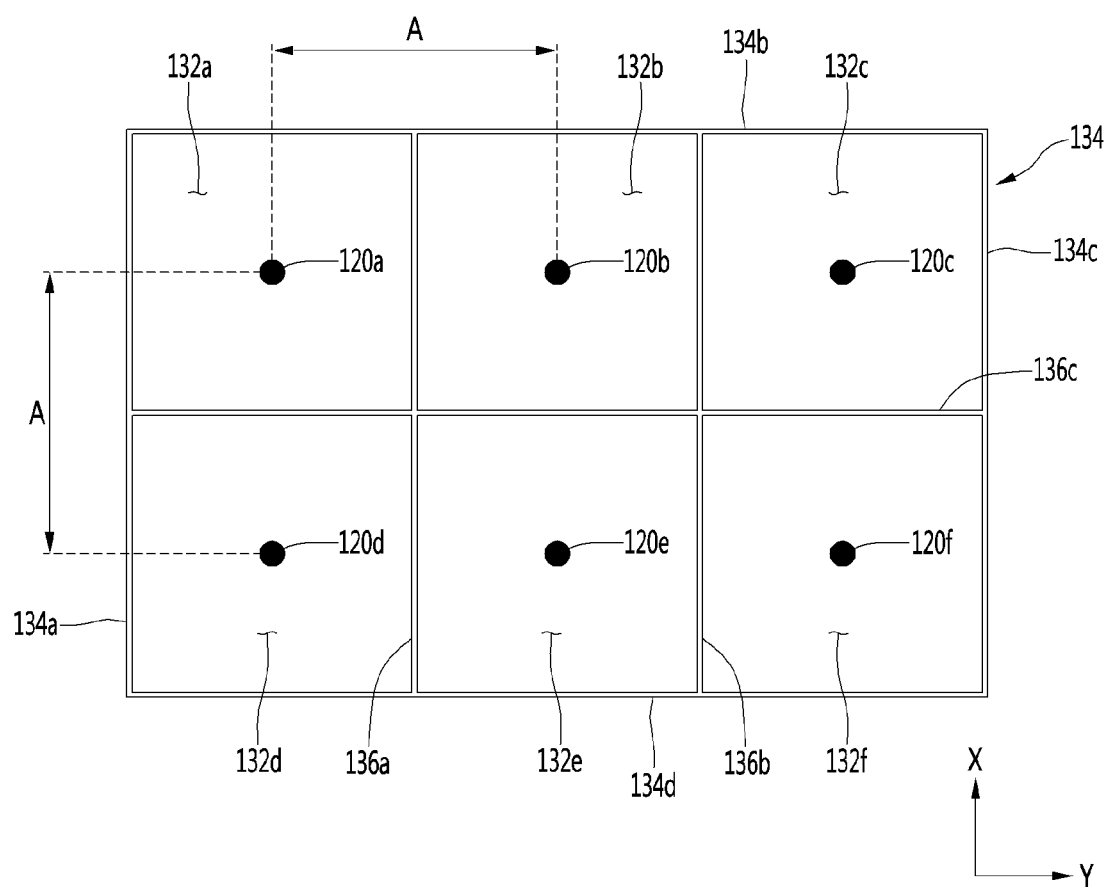
FIG. 5 is a view illustrating a conductive microfiber and a conductive plate of an electrification apparatus for electric dust collection according to an embodiment of the present invention.

FIG. 5 is a view illustrating the conductive microfibers 120 and the conductive plate 130 on the X-Y plane. At this time, the Z-axis means a direction extending vertically forward or backward from the paper.

FIG. 5 is a view illustrating the conductive microfibers 120 and the conductive plates 130 on the X-Y plane. At this time, the Z-axis means a direction extending vertically forward or backward from the paper.

As described above, the conductive microfibers 120 extend in the Z-axis and are installed in the frame 110. The conductive plate 130 has a length in the Z-axis direction so as to correspond to the length of the conductive microfibers 120 in the Z-axis direction.

As illustrated in FIG. 5, six conductive microfibers 120 are provided. It is an example and it is not limited thereto. For the convenience of explanation, the conductive microfibers 120 includes a first microfiber 120a, a second microfiber 120b, a third microfiber 120c, a fourth microfiber 120d, a fifth microfiber 120e, and a sixth microfiber 120f.

The second microfiber 120b and the fourth microfiber 120d are disposed adjacent to each other on the basis of the first microfiber 120a. At this time, being disposed adjacently means being disposed closest to each other.

The second microfiber 120b is spaced apart from the first microfiber 120a in the Y-axis direction. In other words, the first microfiber 120a and the second microfiber 120b are disposed in parallel along the Y-axis direction. At this time, the separation distance between the first microfiber 120a and the second microfiber 120b is defined as an arbitrary distance 'A'.

The fourth microfiber 120d is spaced apart from the first microfiber 120a in the X-axis direction. In other words, the first microfiber 120a and the fourth microfiber 120d are arranged in parallel along the X-axis direction. At this time, the separation distance between the first microfiber 120a and the fourth microfiber 120d may correspond to A. In other words, the first microfiber 120a is spaced apart by the same distance as the adjacent second microfiber 120b and the fourth microfiber 120d.

The third microfiber 120c is spaced apart from the second microfiber 120b by A in the Y-axis direction. In other words, the first microfiber 120a, the second microfiber 120b, and the third microfiber 120c are arranged in parallel along the Y-axis direction.

The fifth microfiber 120e is spaced apart from the fourth microfiber 120d by A in the Y-axis direction. In addition, the sixth microfiber 120f is spaced apart from the fifth microfiber 120e by A in the Y-axis direction. In other words, the fourth microfiber 120d, the fifth microfiber 120e, and the sixth microfiber 120f are arranged along the Y-axis direction.

The fifth microfiber 120e are spaced apart from the second microfiber 120b by A in the X-axis direction. In addition, the sixth microfiber 120f is spaced apart from the third microfiber 120c by A in the X-axis direction.

In summary, the first, second, fourth, and fifth microfibers 120a, 120b, 120d, and 120e correspond to vertexes of a square having a length A on one side on the X-Y plane. The second, third, fifth, and sixth microfibers 120b, 120c, 120e, and 120f correspond to vertexes of a square having a length A on one side on the X-Y plane.

As the number of the conductive microfibers 120 or the installation space of the electrification apparatus 100 is changed, the conductive microfibers 120 may be arranged differently. However, the plurality of conductive microfibers 120 may be disposed at positions corresponding to vertexes of a rectangle.

In addition, as illustrated in FIG. 5, six electrification spaces 132 corresponding to the conductive microfibers 120 are formed on the conductive plate 130. For the convenience of explanation, six electrification spaces 132 include a first electrification space 132a, a second electrification space 132b, a third electrification space 132c, a fourth electrification space 132d, a fifth electrification space 132e, and a sixth electrification space 132f.

In addition, the first to sixth electrification spaces 132 are formed to surround the first to sixth microfibers 120, respectively. Therefore, the first to sixth microfibers 120 are disposed at the centers of the first to sixth electrification spaces 132, respectively. In addition, each electrification space 132 is formed in a square whose a length of each side is A.

In addition, as described above, the outer plate 134 forms the plurality of electrification spaces 132. In other words, the outer plate 134 forms the first to sixth electrification spaces 132.

Specifically, the outer plate 134 includes a first outer plate 134a which extends in the X-axis direction, a second outer plate 134b which extends in the Y-axis direction at one end of the first outer plate 134a, and a third outer plate 134c which extends in the X-axis direction at one end of the second outer plate 134b.

In addition, the outer plate 134 includes a fourth outer plate 134d extending in the Y-axis direction so that the third outer plate 134c and the first outer plate 134a are connected to both ends, respectively. In other words, the outer plate 134 is formed as a rectangular frame, and the first to fourth outer plates 134 correspond to the respective corners.

Specifically, the outer plate 134 forms a rectangle which is 2 A in the X-axis direction and 3 A in the Y-axis direction. In other words, the first and third outer plates 134a and 134c extend in the X-axis by 2 A and the second and fourth outer plates 134b and 134d extend in the Y-axis by 3 A.

The first outer plate 134a is spaced apart from the first and fourth fine particles 120a and 120d by A/2 in the Y-axis direction. In addition, the third outer plate 134a is spaced apart from the third and sixth fine particles 120c and 120f by A/2 in the Y-axis direction.

In addition, the second outer plate 134b is spaced apart from the first, second, and third fine particles 120a, 120b, and 120c by A/2 in the X-axis direction. In addition, the fourth outer plate 134d is spaced apart from the fourth, fifth, and sixth fine particles 120d, 120e, and 120f by A/2 in the X-axis direction.

In addition, the inner plate 136 separates the first to sixth electrification spaces 132. In other words, the inner plate 136 divides the first to sixth electrification spaces 132 formed by the outer plate 134 into electrification spaces 132, respectively.

The inner plate 136 includes a first inner plate 136a and a second inner plate 136b for connecting the second outer plate 134b and the fourth outer plate 134d. The first inner plate 136a and the second inner plate 136b extend in the X-axis direction and are spaced apart from each other in the Y-axis direction.

In addition, the inner plate 136 further includes a third inner plate 136c connecting the first outer plate 134a and the third outer plate 134c. The third outer plate 134c extends in the Y-axis direction through the first and second inner plates 136a and 136b.

In addition, the first and second inner plates 136a and 136b extend in the X-axis by 2 A and the third inner plate 134c extends in the Y-axis by 3 A.

The first electrification space 132a is formed by the first and second outer plates 134a and 134b and the first and third inner plates 136a and 136c, respectively. The second electrification space 132b is formed by the second outer plate 134b and the first, second and third inner plates 136a, 136b, and 136c.

At this time, as illustrated in FIG. 5, the first electrification space 132a and the second electrification space 132b are separated from each other by the first inner plate 136a. In other words, the first inner plate 136a is disposed between the first electrification space 132a and the second electrification space 132b.

Since the first inner plate 136a corresponds to a flat plate having a very small thickness in the Z-axis direction, it can be understood that the area of the first inner plate 136a is very small. In other words, it can be understood that the first inner plate 136a provides a very small influence on the air flow.

At this time, the outer plate 134 and the inner plate 136 are separately referred to, but the conductive plate 130 may be integrally formed. In addition, the conductive plate 130 may be manufactured differently from the distinguished name.

Figure 6:
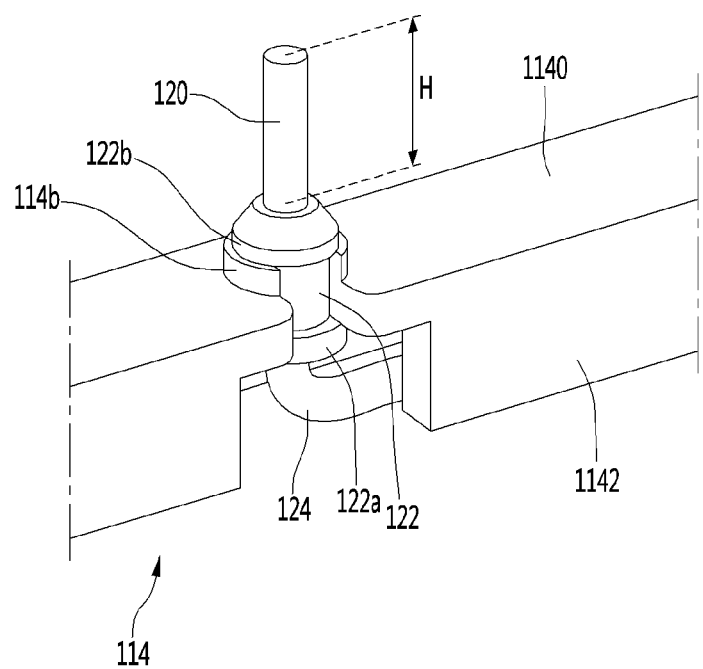
FIG. 6 is a view illustrating a state where conductive microfibers of an electrification apparatus for electric dust collection according to an embodiment of the present invention are installed.
Figure 7:
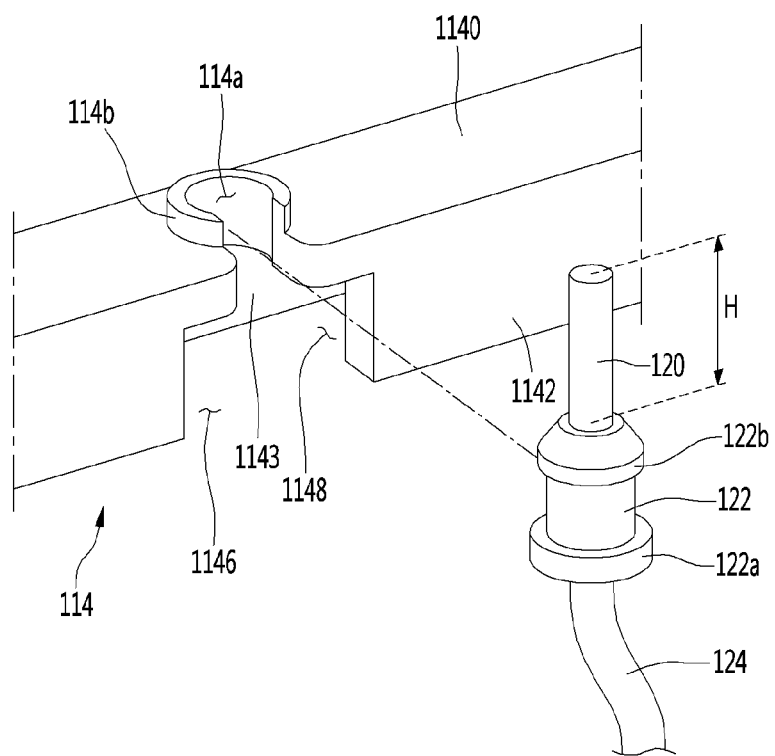
FIG. 7 is a view illustrating a state where conductive microfibers of an electrification apparatus for electric dust collection according to an embodiment of the present invention are separated.

FIG. 6 is a view illustrating a state in which conductive microfibers of the electrification apparatus for electric dust collection according to an embodiment of the present invention are installed, and FIG. 7 is a view illustrating a state where the conductive microfibers of the electrification apparatus for electric dust collection according to an embodiment of the present invention are separated.

FIGS. 6 and 7 are enlarged views of the installation frame 114 to explain the mounting structure of the conductive microfibers 120 specifically. Particularly, the fixing groove 114a formed in the installation frame 114 is enlarged.

In FIGS. 2 to 4, the installation frame 114 is illustrated extending from the inside of the main body frame 112 in the X-axis direction. This is an example and the installation frame 114 may extend in various directions in the X-Y plane to form the fixing groove 114a. For example, the installation frame 114 may extend in the Y-axis direction from the inside of the main body frame 112.

In addition, both ends of the installation frame 114 are not required to be fixed to the main body frame 112. For example, the installation frame 114 may have one end fixed to the main body frame 112 and the other end on which the fixing groove 114a is disposed. In other words, the installation frame 114 may be formed such that one end thereof is fixed and the other end thereof is not fixed.

In addition, the frame 110 includes a plurality of installation frames 114. A plurality of fixing grooves 114a may be formed in one installation frame 114. At this time, the plurality of fixing grooves 114a may be formed at equal intervals.

With reference to FIGS. 2 to 4, the frame 110 includes three installation frames 114. In addition, two fixing grooves 114a are formed in the respective installation frames 114. Each of the fixing grooves 114a is spaced apart from each other at equal intervals. For example, the two fixing grooves 114a formed in one installation frame 114 are spaced apart from each other by A.

At this time, the first and fourth microfibers 120a and 120d, the second and fifth microfibers 120b and 120e, and the third and sixth microfibers 120c and 120f are installed in the respective installation frames 114. However, as described above, this is merely an example. In addition, as the number and disposition of the conductive microfibers 120 are changed, the installation frame 114 may be changed.

In addition, each of the fixing grooves 114a is formed in the same shape and can be coupled to each conductive microfiber 120 in the same manner. Hereinafter, with reference to FIGS. 5 and 6, one conductive microfiber 120 installed in one fixing groove 114a will be described.

As described above, the conductive microfibers 120 extend in the Z-axis direction and are installed in the frame 110. Accordingly, as illustrated in FIGS. 5 and 6, the conductive microfibers 120 have an arbitrary length 'H' in the Z-axis direction.

As described above, the electric wire 124 is connected to the conductive microfiber 120 to apply a high voltage. For the convenience of explanation, some of the electric wires 124 connected to the conductive microfibers 120 are illustrated. The conductive microfibers 120 may be understood as one end portion of the electric wire 124.

In other words, the conductive microfibers 120 correspond to a portion where a carbon fiber or the like is exposed to the outside. On the other hand, the electric wire 124 corresponds to a portion where the carbon fiber or the like is not exposed to the outside due to a cable sheath. In addition, the conductive microfibers 120 may be understood as a portion where a discharge is generated.

In addition, a rubber 122 is disposed between the conductive microfiber 120 and the electric wire 124. The rubber 122 can be understood as a structure for installing the conductive microfiber 120 in the fixing groove 114a.

In other words, the rubber 122 corresponds a configuration which is directly fitted into the fixing groove 114a. The rubber 122 may correspond to a nonconductive material and function to insulate the conductive microfibers 120 from the frame 110.

The rubber 122 is disposed so as to surround the outside of the conductive microfibers 120 or the electric wire 124. At this time, the length (height) of the conductive microfiber 120 in the Z-axis direction can be understood as the length from the upper end to the rubber 122.

At this time, the height of the conductive microfiber 120 corresponds to an important factor determining the electrification performance. Therefore, it is important to manufacture the electrification apparatus 100 while keeping the height of the conductive microfiber 120 constant.

The rubber 122 is mounted at a predetermined position, and the rubber 122 is fitted into the fixing groove 114a. Accordingly, the conductive microfibers 120 may be installed in the frame 110 to have a constant height. In other words, the height of the conductive microfibers 120 can be kept constant, and the electrification performance can be maximized.

The rubber 122 is provided with a first protrusion portion 122b and a second protrusion portion 122a. The first protrusion portion 122b and the second projecting portion 122a are understood as portions where the rubber 122 is disposed at the correct position.

Specifically, the rubber 122 is provided in a cylindrical shape having an inner opening so as to surround the outside of the electric wire 124. The first protrusion portion 122b and the second protrusion portion 122a are further protruded outwardly.

In addition, the first protrusion portion 122b and the second protrusion portion 122a are spaced apart from each other. Accordingly, the rubber 122 can be fitted into the fixing groove 124a such that the first protrusion portion 122b is positioned on the upper portion of the fixing groove 114a and the second protrusion portion 122a is positioned on the lower side of the fixing groove 114b.

At this time, the first protrusion portion 122b is formed closer to the conductive microfibers 120 than the second protrusion portion 122a. For the sake of stability, the first protrusion portion 122b may protrude less outward than the second protrusion portion 122a. In addition, a portion from the first protruding portion 122b to the upper end of the rubber 122 may be inclined toward the conductive microfibers 120.

The installation frame 114 may be formed of a plurality of surfaces. Specifically, the installation frame 114 is provided with a first installation surface 1140 on which the fixing groove 114a is formed and a second installation surface 1142 and a third installation surface 1144 which extend from the first installation surface 1140.

The second and third installation surfaces 1142 and 1144 may be formed by bending both sides of the first installation surface 1140. As described above, the installation frame 114 configured with the first, second and third installation surfaces 1140, 1142 and 1144 may extend in various directions on the X-Y plane.

The fixing groove 114a is formed in a circular shape corresponding to the outer shape of the rubber 122. One side of the fixing groove 114a is opened so that the rubber 122 can be inserted into the fixing groove 114a. For example, the side where the second installation surface 1142 is disposed may be opened.

In addition, the second installation surface 1142 is formed with an installation hole 1146 through which the rubber 122 and the electric wire 124 pass. The installation hole 1146 may extend from the fixing groove 114a. For the convenience of installation, the installation hole 1146 may be wider than the fixing groove 114a.

In addition, a rubber support portion 114b for supporting the rubber 122 may be provided on an upper portion of the fixing groove 114a. The rubber support portion 114b is formed in a ring-shaped shape with one side opened at an upper portion of the fixing groove 114a. Accordingly, the first protrusion portion 122b can be seated on the upper end of the rubber support portion 114b.

In addition, the second protrusion portion 122a may be seated at a lower portion of the fixing groove 114a, that is, at a lower end of the first installation surface 1140. Accordingly, the rubber 122 may be fixed to the first installation surface 1140.

In addition, the rubber 122 is made of an elastic material and can be easily mounted on the fixing groove 114a. Specifically, when the rubber 122 is inserted into the fixing groove 114a, as the rubber 122 is deformed, it can be inserted into the fixing groove 114a more easily. In addition, when the rubber 122 is inserted into the fixing groove 114a, the rubber 122 may be returned to an original state thereof and be in close contact with the fixing groove 114a.

In addition, since the rubber 122 is made of an elastic material, it is possible to absorb a predetermined impact. Specifically, the impact applied to the electrification apparatus 100 can be prevented from being transmitted to the conductive microfibers 120 by being absorbed by the rubber 122.

For example, in a case where the electrification apparatus 100 is installed in the air conditioner for a vehicle 10, the vibration of the vehicle, external impact, and the like may be transmitted to the electrification apparatus 100. Since the rubber 122 absorbs the vibration of the vehicle, external impact, and the like, the position of the conductive microfibers 120 can be fixed.

The position of the conductive microfibers 120 on the X-Y plane can be determined as the rubber 122 is fitted into the fixing groove 114a formed at the predetermined position. In other words, the position and height of the conductive microfibers 120 can be determined by inserting the rubber 122 into the fixing groove 114a.

In other words, the conductive microfibers 120 can be disposed at a correct position through a simple assembly procedure. Accordingly, the conduction performance can be kept in a maximized state.

Figure 8:
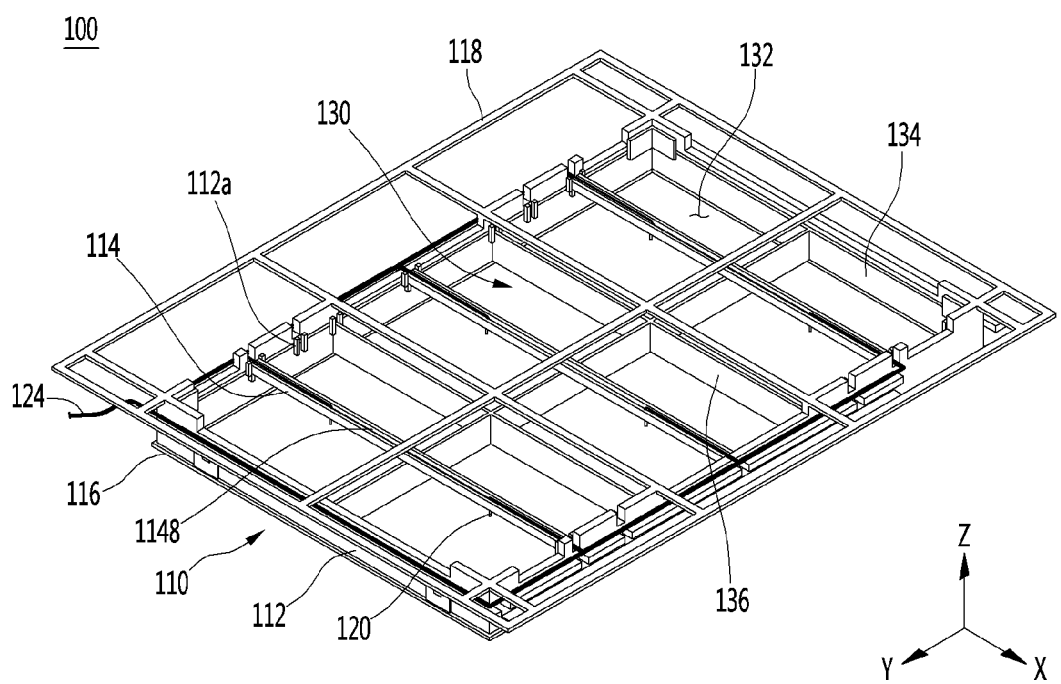
FIG. 8 is a view illustrating a state in which electric wires of an electrification apparatus for electric dust collection according to an embodiment of the present invention are installed.

FIG. 8 is a view illustrating a state in which electric wires of an electrification apparatus for electric dust collection according to an embodiment of the present invention are installed.

As illustrated in FIG. 8, the electric wire 124 is installed along the frame 110. Specifically, the electric wires 124 extending from the respective conductive microfibers 120 are joined together along the frame 110 and extend outward.

Specifically, the electric wires 124 extend from the conductive microfibers 120 to the main body frame 112 along the installation frame 114, respectively. The electric wires 124 further extend along the outside of the main body frame 112 and are joined together. The electric wires 124 further extend outward through one corner of the main body frame 112.

At this time, the externally extended electric wire 124 may be connected to a connector, a switch, an external power source, or the like. For the convenience of illustration, the wires 124 extending to the outside are omitted.

As described above, the installation frame 114 is formed of the first, second, and third installation surfaces 1140, 1142, and 1144. The second and third installation surfaces 1142 and 1144 may be formed by bending both sides of the first installation surface 1140. Accordingly, the cross-section of the installation frame 114 may be formed in a 'C' shape.

The installation frame 114 includes an electric wire installation portion 1148 formed by the first, second, and third installation surfaces 1140, 1142, and 1144. With reference to FIG. 6, the wire installation portion 1148 corresponds to a space formed between the lower portion of the first installation surface 1140 and the second and third installation surfaces 1142.

With reference to FIG. 5, the electric wire 124 extending from the conductive microfibers 120 may be seated inside the electric wire installation portion 1148. Then, the electric wire 124 can be fixed to the electric wire installation portion 1148 through a coupling member such as a tape or the like.

As the wire 124 is fixed, the conductive microfibers 120 can be more stably fixed. In addition, since the electric wire 124 is installed inside the installation frame 114, a clean outer appearance can be formed and damage due to an external obstacle or the like can be prevented.

In addition, the electric wire 124 extending to the main body frame 112 may be fixed to the main body frame 112 through a coupling member such as a tape or the like. In addition, a space for inserting the electric wire 112 may be formed in the main body frame 112.

In addition, a ground electric wire for applying a ground electrode to the conductive plate 130 may be connected to one side of the conductive plate 130. In particular, the ground electric wires may be connected to a portion where the electric wires 124 are joined together. Accordingly, the electric wire 124 and the ground electric wire can extend to the outside together.

In addition, the wires 124 and the ground wires may be connected together to the connector. Such a connector may be coupled to an external connector connected to an external power source. For example, the external power source may correspond to a battery of a vehicle.

Therefore, in a case where the electrification apparatus 100 is cleaned or replaced, the connector can be separated to block the power. In addition, by separating the connector, the electrification apparatus 100 can be easily separated from the air conditioner for a vehicle 1.

Thus, the conductive microfibers 120 can be fixed at a correct position through a simple assembling process. Accordingly, the electrification performance of the electrification apparatus 100 can be kept at the maximum.

DESCRIPTION OF REFERENCE NUMERALS

1: air conditioner for vehicle
10: electric dust collection assembly

100: electrification apparatus (for electric dust collection)
110: frame
112: main body frame
114: installation frame
114a: fixing groove
120: conductive microfiber
122: rubber
124: electric wire
130: conductive plate
200: collector (for electric dust collection)

What is claimed is:

1. An electrification apparatus for electric dust collection, comprising:
a frame;
a conductive microfiber disposed in the frame and configured to generate ions in air; and
conductive plates disposed in the frame and configured to generate a potential difference with the conductive microfiber;
an electric wire connected to the conductive microfiber and configured to apply a high voltage to the conductive microfiber,
wherein the frame comprises:
a main body frame that accommodates the conductive plates, and
an installation frame that defines a fixing groove configured to receive the conductive microfiber,
wherein the electrification apparatus further comprises a rubber structure coupled with the conductive microfiber and configured to insert into the fixing groove, the rubber structure having a cylindrical shape and defining an inner opening that surrounds an outside of the conductive microfiber or the electric wire,
wherein the installation frame comprises:
a first installation surface that defines the fixing groove,
a second installation surface that extends downward from a first side of the first installation surface, the second installation surface defining an installation hole configured to receive the rubber structure and the electric wire, and
a third installation surface that extends downward from a second side of the first installation surface, and
wherein the first installation surface, the second installation surface, and the third installation surface define an installation space that accommodates and covers the electric wire.

2. The electrification apparatus according to claim 1, wherein the electric wire extends from the conductive microfiber along the installation frame.

3. The electrification apparatus according to claim 2, wherein at least one end of the installation frame is connected to the main body frame, and
wherein the electric wire extends to the main body frame along the installation frame and further extends along the main body frame, the electric wire extending to an outer power source through the main body frame.

4. The electrification apparatus according to claim 1, wherein the rubber structure is coupled between the conductive microfiber and the electric wire.

5. The electrification apparatus according to claim 1, wherein the installation space has a bottom opening that is defined by the second installation surface and the third installation surface.

6. The electrification apparatus according to claim 1, wherein the fixing groove, the installation hole, and the installation space are in communication with one another.

7. The electrification apparatus according to claim 1, wherein the conductive microfiber protrudes above the first installation surface, and the electric wire is located below the first installation surface, and
wherein at least a portion of the rubber structure protrudes above the first installation surface.

8. The electrification apparatus according to claim 1, wherein the installation frame further comprises a rubber support protrusion that protrudes upward from the first installation surface and that surrounds at least a portion of the rubber structure.

9. The electrification apparatus according to claim 8, wherein the rubber support protrusion has a ring shape, and the fixing groove extends through the rubber support protrusion.

10. The electrification apparatus according to claim 1, wherein an outer circumferential surface of the rubber structure is in contact with an inner circumferential surface of the fixing groove.

11. The electrification apparatus according to claim 10, wherein the rubber structure comprises a protrusion that protrudes radially outward from the outer circumferential surface of the rubber structure and that is disposed below the fixing groove, the protrusion having a ring shape extending along the outer circumferential surface of the rubber structure.

12. The electrification apparatus according to claim 11, wherein the installation frame further comprises a rubber support protrusion that protrudes upward from an upper surface of the installation frame, that surrounds at least a portion of the rubber structure, and that supports the protrusion of the rubber structure.

13. The electrification apparatus according to claim 12, wherein the rubber support protrusion has a side opening that is connected to the fixing groove and that is configured to receive the rubber structure.

14. The electrification apparatus according to claim 10, wherein the rubber structure comprises:
a first protrusion that protrudes radially outward from the outer circumferential surface of the rubber structure, that is disposed below the fixing groove, and that extends along the outer circumferential surface of the rubber structure; and
a second protrusion that protrudes radially outward from the outer circumferential surface of the rubber structure, that is disposed above the fixing groove, and that extends along the outer circumferential surface of the rubber structure.

15. The electrification apparatus according to claim 14, wherein the first protrusion of the rubber structure surrounds the electric wire, and the second protrusion of the rubber structure surrounds the conductive microfiber.

16. The electrification apparatus according to claim 14, wherein the installation frame comprises a rubber support protrusion that protrudes upward from an upper surface of the installation frame, that surrounds at least a portion of the rubber structure, and that supports the second protrusion of the rubber structure.

17. The electrification apparatus according to claim 1, wherein the installation hole extends to the fixing groove.

* * * * *